United States Patent
Han et al.

(10) Patent No.: US 11,632,495 B2
(45) Date of Patent: Apr. 18, 2023

(54) METHOD AND APPARATUS FOR ADJUSTING SOUND VOLUME IN SHOOTING PROCESS

(71) Applicant: BEIJING XIAOMI MOBILE SOFTWARE CO., LTD., Beijing (CN)

(72) Inventors: Xiujun Han, Beijing (CN); Haipo Zhang, Beijing (CN); Chong Jia, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/520,446

(22) Filed: Nov. 5, 2021

(65) Prior Publication Data
US 2022/0311942 A1    Sep. 29, 2022

(30) Foreign Application Priority Data
Mar. 29, 2021    (CN) ......................... 202110335799.X (51) Int. Cl.
*H04N 5/225*    (2006.01)
*H04N 5/232*    (2006.01)
*G06F 3/16*    (2006.01)

(52) U.S. Cl.
CPC ....... *H04N 5/232121* (2018.08); *G06F 3/165* (2013.01); *H04N 5/232127* (2018.08); *H04N 5/232935* (2018.08)

(58) Field of Classification Search
CPC ....... H04N 5/232121; H04N 5/232127; H04N 5/232935; G06F 3/165
USPC ........................................................ 348/348
See application file for complete search history.

(56) References Cited

U.S. PATENT DOCUMENTS

| | | | |
|---|---|---|---|
| 10,592,199 B2 * | 3/2020 | Rakshit | G11B 27/102 |
| 2003/0151678 A1 * | 8/2003 | Lee | H04N 5/23296 |
| | | | 381/104 |
| 2005/0099511 A1 * | 5/2005 | Cazier | H03G 3/30 |
| | | | 348/231.4 |
| 2006/0210257 A1 * | 9/2006 | Yoon | G03B 29/00 |
| | | | 396/78 |
| 2010/0302401 A1 * | 12/2010 | Oku | H04N 9/8042 |
| | | | 348/222.1 |
| 2011/0317023 A1 * | 12/2011 | Tsuda | H04R 1/406 |
| | | | 348/207.99 |
| 2013/0342731 A1 * | 12/2013 | Lee | H04N 5/23218 |
| | | | 348/231.4 |
| 2014/0063327 A1 * | 3/2014 | Kwon | H04N 5/23212 |
| | | | 348/346 |
| 2015/0036856 A1 * | 2/2015 | Pruthi | G10L 15/26 |
| | | | 381/317 |

FOREIGN PATENT DOCUMENTS

| | | |
|---|---|---|
| EP | 3073747 A1 | 9/2016 |
| JP | H09168139 A | 6/1997 |

OTHER PUBLICATIONS

Extended European Search Report of EP Application No. 21205627.9 dated Mar. 23, 2022, (8p).

* cited by examiner

*Primary Examiner* — Usman A Khan
(74) *Attorney, Agent, or Firm* — Arch & Lake LLP (57) ABSTRACT

A shooting method that includes: adjusting a sound volume of a collected sound according to a focusing distance in the image collection process, and displaying volume information corresponding to the sound volume on an image preview interface.

14 Claims, 7 Drawing Sheets

METHOD AND APPARATUS FOR ADJUSTING SOUND VOLUME IN SHOOTING PROCESS

CROSS REFERENCE TO RELATED APPLICATIONS

The present application is based on and claims priority of the Chinese Patent Application No. 202110335799.X, filed on Mar. 29, 2021, the entire content of which is incorporated herein by reference for all purposes.

BACKGROUND

In the process of shooting a video with a shooting device such as a mobile phone and a tablet computer, a microphone of the shooting device is generally configured to collect audio to obtain the audio of a shot video file.

Due to the diversity of shooting scenes, audio files recorded when videos are shot in different scenes may contain a lot of noise, while the sound of a main shot target is not prominent, and a user's shooting intention cannot be well achieved, which affects the user experience.

SUMMARY

The present disclosure relates to an audio collection and processing technology, in particular to a method and apparatus for adjusting sound volume in shooting process.

A first aspect of an example of the present disclosure provides a shooting method. The method may include adjusting a sound volume of a collected sound according to a focusing distance in an image collection process; and displaying volume information corresponding to the sound volume on an image preview interface.

A second aspect of an example of the present disclosure provides a computer apparatus. The computer apparatus may include a processor; and a memory, configured to store an executable instruction of the processor; wherein the processor is configured to: adjust a sound volume of a collected sound according to a focusing distance in an image collection process; and display volume information corresponding to the sound volume on an image preview interface.

A third aspect of an example of the present disclosure provides a non-transitory computer-readable storage medium, in which when an instruction stored in the storage medium is executed by a processor of a mobile terminal, the mobile terminal may perform adjusting a sound volume of a collected sound according to a focusing distance in an image collection process; and displaying volume information corresponding to the sound volume on an image preview interface.

It is to be understood that both the foregoing general description and the following detailed description are exemplary and explanatory only and are not restrictive of the present disclosure.

BRIEF DESCRIPTION OF THE DRAWINGS

Accompanying drawings here, which are incorporated in and constitute a part of this specification, illustrate examples consistent with the present disclosure and, together with the description, serve to explain principles of the present disclosure.

DETAILED DESCRIPTION

Reference will now be made in detail to the examples, examples of which are illustrated in the accompanying drawings. When the following description refers to the accompanying drawings, like numerals in different drawings indicate the same or similar elements, unless otherwise indicated. The implementations described in the following examples do not represent all implementations consistent with the present disclosure. Rather, they are merely examples of an apparatus and method consistent with some aspects of the present disclosure.

Due to the diversity of shooting scenes of videos, audio files recorded when the videos are shot in different scenes may contain a lot of noise, while the sound of a main shot target is not prominent, and a user's shooting intention cannot be well achieved, which affects the user experience.

Examples of the present disclosure provide a shooting method and apparatus for adjusting sound volume in shooting process. When image collection is carried out, audio collection is performed on a target shot subject according to a focusing distance in the shooting process, which achieves effect that the sound of the target shot subject is prominent.

Figure 1:
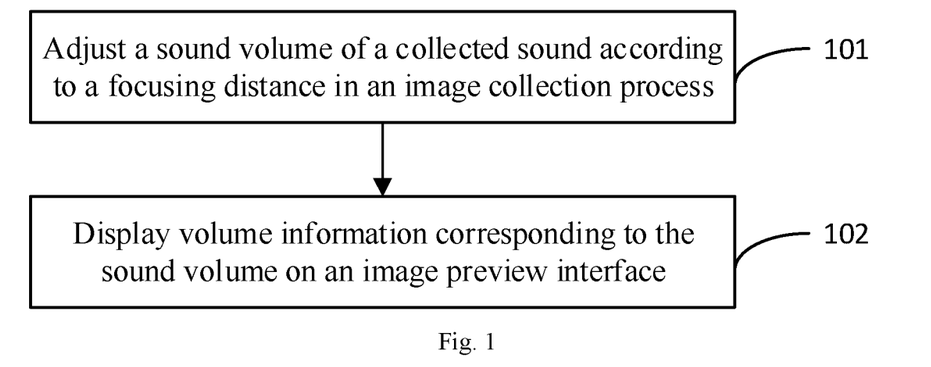
FIG. 1 is a flowchart of a shooting method shown according to some examples of the disclosure.

An example of the present disclosure provides a shooting method. A flow of adjusting a sound volume of a collected sound according to actual shooting conditions in the image collection process by using the method is as shown in FIG. 1, and may include:

Step 101: the sound volume of the collected sound is adjusted according to a focusing distance in the image collection process.

In this step, in the image collection operation process such as a video shooting stage and a preview shooting stage (for example, a preview stage before a user performs shooting), the sound volume of the collected sound may be adjusted according to a focusing distance of an image preview interface.

Part or all of subjects within a view-finding range (that is, an image collection range) of the image preview interface may serve as a sound-producing object, and a sound made by the sound-producing object may serve as the collected sound. In some examples, the collected sound may also include sounds outside the view-finding range of the image preview interface.

In one example, the present disclosure may use beamforming technology to achieve the directional acquisition of the sound-producing object. For example, spatial audio may be captured by a predetermined number of microphone components configured on device, and the captured audio space can be used to determine the spatial information and sound of each sound-producing object. The microphone components are respectively configured in a specific location of the device.

For example, the sound volume of the collected sound of the sound-producing object may be adjusted according to a focusing distance of the sound-producing object in the image preview interface.

Step 102: volume information corresponding to the sound volume is displayed on the image preview interface.

In this step, the volume information may include a volume value of the sound volume, and/or a graphic identifier associated with the volume value, etc. Displaying, on the image preview interface, the volume information of the collected sound associated with the focusing distance in the image collection process may help the user understand the volume change, and provide the user with a direct visual perception.

The technical solution provided by the examples of the present disclosure may achieve the following beneficial effects: the sound volume of the collected sound is adjusted according to the focusing distance in the image collection process, and the volume information corresponding to the sound volume is displayed on the image preview interface, so that a flexible sound collection solution adapted to an image in the image collection process is realized, and the problem that a sound is uncontrollable in the image collection process and affects user experience is solved.

In some examples, the volume information may be displayed in a specific region of the image preview interface. For example, the specific region may be a setting region preset on the image preview interface to display the volume information, for example, the specific region may be a region adjacent to a preset edge of the image preview interface, thus avoiding affecting the user to check a shot region of interest. Or, for example, the specific region may be a preset region of the sound-producing object associated with the collected sound on the image preview interface, for example, the specific region may be a region adjacent to the sound-producing object associated with the collected sound, and thus the user may visually check the volume change of the sound-producing object.

In some examples, the volume information may be displayed on the image preview interface through a volume display control.

For example, the volume display control may be displayed in the preset region of the sound-producing object in the image preview interface. The preset region of the sound-producing object is a region that follows the sound-producing object to move on the image preview interface. The volume display control is displayed near the sound-producing object, so as to more intuitively show the sound volume of the collected sound corresponding to the sound-producing object.

For example, taking a mobile phone as a shooting device for example, the volume display control may be set in a specific region of a shooting application interface (i.e., the image preview interface) of the mobile phone, so as to display a current volume of the collected sound intuitively and visually, which helps the user understand the volume change.

The volume display control may also be configured to receive a user operation to input a volume adjustment instruction.

The position of the volume display control may be relatively fixed, that is, after the user sets the position, the volume display control is fixed at the position set by the user last time before the user changes the setting. The volume display control may also move dynamically, for example, moving with a target shot subject in a follow shooting mode.

Figure 2:
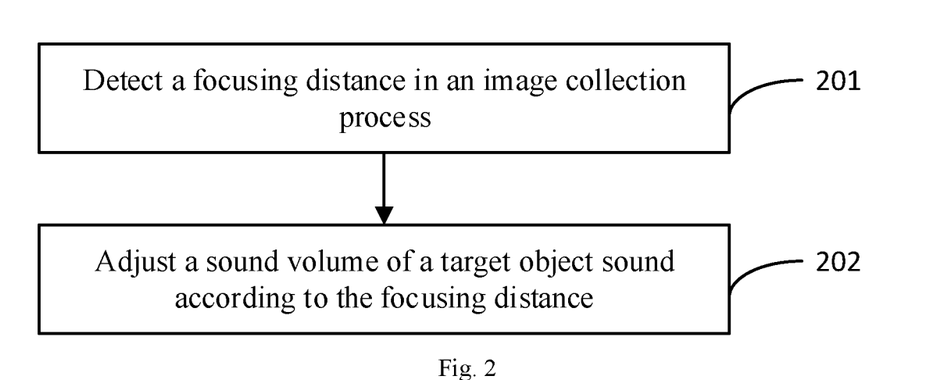
FIG. 2 is a flowchart of another shooting method shown according to some examples of the disclosure.

An example of the present disclosure also provides a shooting method. A flow of adjusting a sound volume of a collected sound according to a focusing distance is as shown in FIG. 2, and may include:

Step 201: the focusing distance in the image collection process is detected.

In this step, in the image collection process, the focusing distance is detected in real time. In some examples, the focusing distance may be detected after the focusing distance changes.

The focusing distance is a distance between a preview image and a lens. For example, the focusing distance may be a distance between a focus of the preview image and the lens, and a user may perform an operation of zooming out or zooming in to adjust the focusing distance (for example, swiping on a touch screen of a mobile phone to change the focal length).

Figure 3:
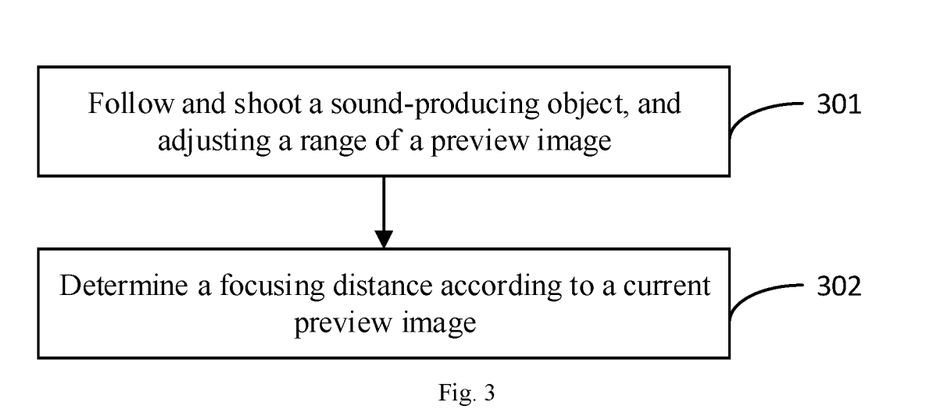
FIG. 3 is a flowchart of yet another shooting method shown according to some examples of the disclosure.

In step 201, the focusing distance may be detected in a follow shooting mode. A flow is as shown in FIG. 3, and may include:

Step 301: a sound-producing object is followed and shot, and the range of the preview image is adjusted.

Follow shooting (also called tracking shooting) is to use the lens to follow a shot subject so that the sound-producing object, serving as the shot subject, may be located at the same position or within the same position range of the preview image in the shooting process. In this example, the sound-producing object may be automatically locked, and followed to be shot.

In the process of follow shooting, along with the movement of the sound-producing object and a shooting device, the range of the preview image may be adjusted, including adjustment of parameters such as the focusing distance and the image range.

Step 302: the focusing distance is determined according to a current preview image.

In this step, the focusing distance is determined according to the preview image that changes in real time.

Figure 4:
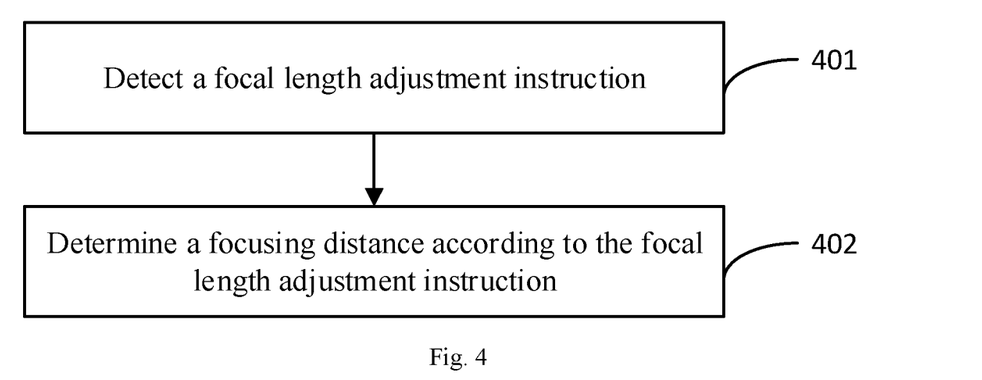
FIG. 4 is a flowchart of yet another shooting method shown according to some examples of the disclosure.

In step 201, the focusing distance may also be detected according to the user operation in the image collection process. A flow is as shown in FIG. 4, and includes:

Step 401: a focal length adjustment instruction is detected.

In this step, the focal length adjustment instruction issued by the user is detected. In some examples, the focal length adjustment instruction issued by the user through a touch screen is detected. For example, a focal length adjustment region is displayed on a specific region of the touch screen, and the focusing distance may be adjusted by a swiping operation on the focal length adjustment region. Swiping in both directions may zoom out or zoom in the focusing distance respectively. According to the zooming out or zooming in the focusing distance indicated by the focal length adjustment instruction, the preview image changes accordingly.

Step 402: the focusing distance is determined according to the focal length adjustment instruction.

After the focusing distance is determined, step 202 may be entered into, that is, the sound volume is determined according to the focusing distance.

Step 202: the sound volume of a target object sound is adjusted according to the focusing distance, in which a sound-producing object of the target object sound is located within an image collection range corresponding to the focusing distance.

In the example of the present disclosure, the target object sound may be a target object sound within the image collection range (that is, a view-finding range).

In one example, the present disclosure may use beamforming technology to achieve the directional acquisition of the sound-producing object. For example, spatial audio may be captured by a predetermined number of microphone components configured on device, and the captured audio space can be used to determine the spatial information and sound of each sound-producing object. The microphone components are respectively configured in a specific location of the device.

In the example of the present disclosure, after the focusing distance is acquired, the spatial position of each shot subject within the image collection range can be determined according to the focusing distance. The target object sound within the image collection range is determined by matching the spatial position with spatial information of each sound-producing object determined based on the audio space.

An audio collection configuration file may be preset, and the audio collection configuration file includes at least one set of correspondence relation between the focusing distance and the sound volume.

By matching the focusing distance with the preset audio collection configuration file, the sound volume of the target object sound at the focusing distance may be determined.

In general, the longer the focusing distance, the lower the corresponding volume, while the shorter the focusing distance, the louder the corresponding volume. Thus, an effect that the sound volume of a target shot subject changes with the distance of the target shot subject may be presented.

Figure 5:
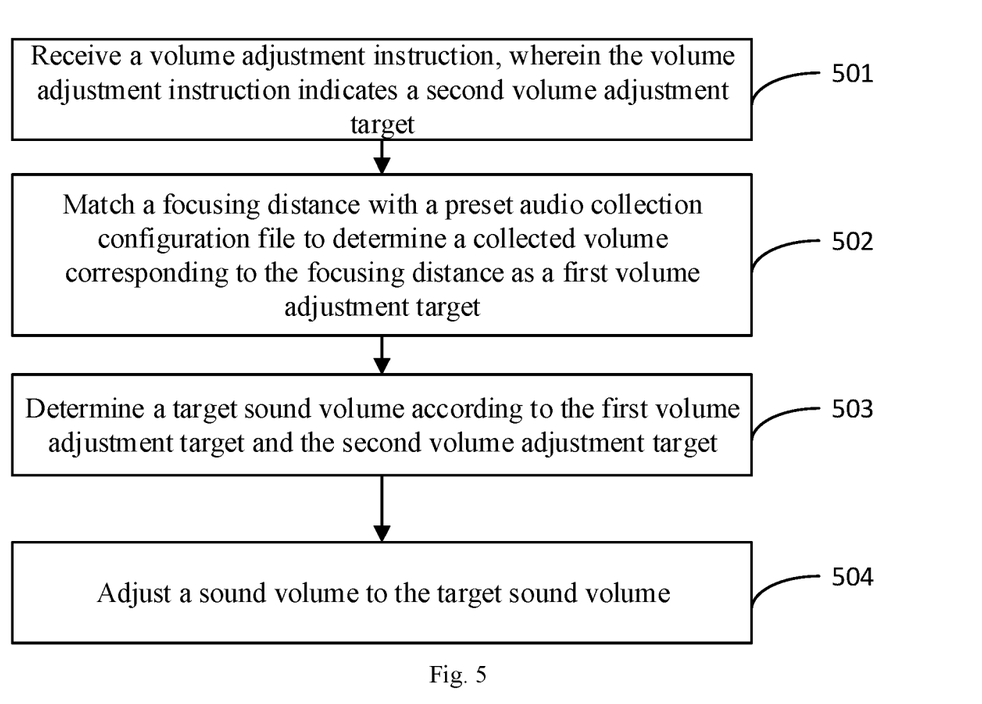
FIG. 5 is a flowchart of yet another shooting method shown according to some examples of the disclosure.

In this step, the sound volume may also be determined according to a user instruction. A flow is as shown in FIG. 5, and includes:

Step 501: a volume adjustment instruction is received, in which the volume adjustment instruction indicates a second volume adjustment target.

In this step, the volume adjustment instruction input by the user is received. The user may receive the volume adjustment instruction through an input apparatus of the shooting device. The input apparatus includes at least any of the touch screen, a keyboard, or keys.

The volume adjustment instruction may be received through a volume display control of an image preview interface.

A mode of receiving a sound adjustment input of the user to obtain the volume adjustment instruction may include: a first touch input on the image preview interface, in which the first touch input may be at least one of touch input modes such as swipe input, long press input, or press input (in some examples, in the press input, the user may adjust the volume based on the press pressure, for example, when it is received that a press force input by the user becomes larger, the sound volume is turned up according to a preset ratio, and when it is received that the press force input by the user becomes smaller, the sound volume is turned down according to a preset ratio); and/or, a second touch input on the volume display control, in which the second touch input is at least one of the touch input modes such as swipe input, long press input, or press input.

Step 502: the focusing distance is matched with the preset audio collection configuration file to determine a collected volume corresponding to the focusing distance as a first volume adjustment target.

The audio collection configuration file may be preset in the shooting device, and the audio collection configuration file includes at least one set of correspondence relation between the focusing distance and the volume.

In this step, the corresponding collected volume is obtained according to the focusing distance as the first volume adjustment target.

Step 503: a target sound volume is determined according to the first volume adjustment target and the second volume adjustment target.

In this step, the target sound volume may be determined according to the first volume adjustment target and the second volume adjustment target in a preset calculation mode associated with the first volume adjustment target and the second volume adjustment target. For example, the preset calculation mode may be one or a combination of a preset weight ratio calculation mode, a preset average calculation mode, or a preset variance calculation mode.

For example, an average value of the first volume adjustment target and the second volume adjustment target may be determined as the target sound volume; and/or, in a case where the first volume adjustment target and the second volume adjustment target are inconsistent, the target sound volume is determined according to the second volume adjustment target.

It should be noted that the rules of determining a volume of a collected sound may be flexibly set according to application scenarios and device processing capabilities, and updated or changed during use, and are not limited to the above two examples.

Step 504: the sound volume is adjusted to the target sound volume.

After the sound volume is determined according to step 202, real-time sound collection may be performed according to the sound volume. Thus, an audio file with the sound volume adjusted in real time is obtained, and finally a file with parameters such as the sound volume changing along with adjustment of a collected image is formed.

Figure 6:
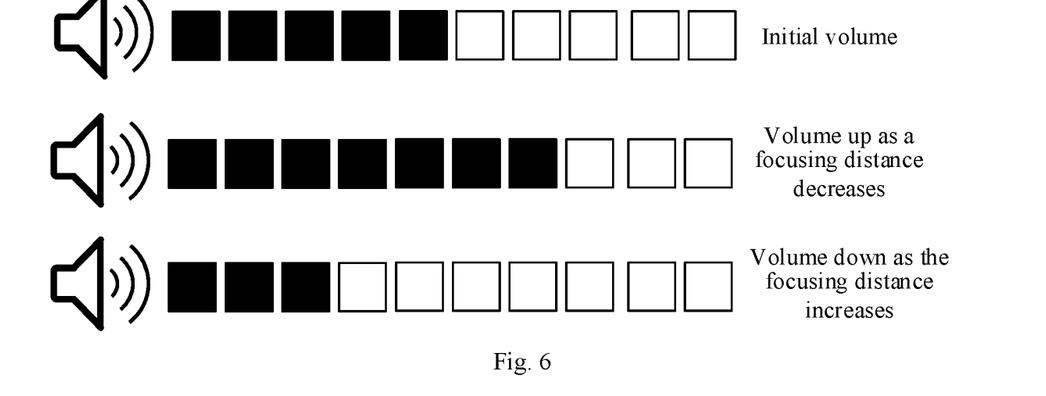
FIG. 6 is a schematic diagram of a volume display control shown according to some examples of the disclosure.

An example of the present disclosure also provides a shooting method. A volume display control is disposed in a specific region of a preview image to display a volume of collected audio more intuitively. The volume display control may include a control identifier and a volume display identifier. FIG. 6 is an example of a display mode, in which the leftmost is a volume icon (i.e., the control identifier), and a row of squares (i.e., the volume display identifier) on the right side indicate the volume through color change. When a zoom value increases, the quantity of colored squares in the volume display control will also increase, the volume of the collected audio is turned up, and the remaining white squares indicate the space where the zoom value/volume value of the collected sound may be increased. When the zoom value decreases, the volume of the collected audio is turned down, and the quantity of the colored squares in the volume display control decreases accordingly. The corresponding zoom value is transmitted to a bottom layer, such that the bottom layer turns up or down the sound volume of the collected sound through an algorithm, and changes audio played in the region, thus achieving the effect of directional enhancement of the audio. In some possible examples, in order to simplify the identifiers and reduce the obstruction of the identifier display on the user's vision, the volume display control may include the volume display identifier, but not the control identifier.

It will be appreciated that the volume display identifier in the square form is taken as an a display mode for example. In some possible examples, the volume display identifier may be a digital identifier (for example, a digital graphic identifier or a digital pattern identifier that represents the volume value), and/or, the volume display identifier may be other graphic identifiers or pattern identifiers (such as a sliding axis graphic identifier) that represents value change.

Taking a mobile phone as a shooting device for example, in the recording process of a camera of the mobile phone, the zoom value is increased through manual zooming or slider zooming. The maximum zoom value in the current scenario is denoted as $N_{max}$, the minimum zoom value in the current scenario is denoted as $N_{min}$, and a current zoom value is denoted as $N_{cur}$. The range of zoom change is obtained by Formula 1 and denoted as $N_{range}$. The range of zoom change correspond to 10 squares presenting the volume as shown in FIG. 6, and a zoom value interval corresponding to each square is obtained by Formula 2 and denoted as $N_{onepoint}$. The quantity of squares representing the current zoom value is obtained by Formula 3 and denoted as $N_{real}$.

$$N_{range} = N_{max} - N_{min} \qquad 1$$

$$N_{onepoint} = N_{range}/10 \qquad 2$$

$$N_{real} = (N_{cur} - N_{min})/N_{onepoint} \qquad 3$$

If $N_{real}$ is not greater than 1, the transparency of all the squares is 0, that is, the squares are completely transparent or colorless. On the contrary, the transparency $N_{alpha}$ of the next square on the right is obtained by Formula 4, a color of the squares representing the current zoom value is set to follow a color of a camera theme, the quantity $N_{real}$ of the squares representing the current zoom value is added with a transparency, and the remaining squares are white, and added with a transparency of 255, that is, opaque. When it is detected that the zoom value changes, the state of the squares is continuously updated, so as to show the dynamic change of the zoom value through UI.

$$N_{alpha} = ((N_{cur} - N_{min})\% \ N_{onepoint})/N_{onepoint} \qquad 4$$

Meanwhile, the current zoom value is transmitted to the bottom layer. When the zoom value increases, the volume of the collected sound may be enhanced by the underlying algorithm, and when the zoom value decreases, the volume of the collected sound may be reduced by the underlying algorithm, which achieves the effect of directional enhancement of the audio.

An example of the present disclosure also provides a shooting method. The shooting method is applied to a shooting device (the shooting device may be an electronic device such as a mobile phone and a tablet computer). A volume display control is disposed in a specific region of a preview image to display a volume of collected audio more intuitively. When a user adjusts the volume display control, a volume of a sound collected at a position corresponding to a focusing distance may be changed.

When zooming to an appropriate zoom value in the video recording process, if the user is not satisfied with the volume of the collected sound obtained along with automatic adjustment of the zoom value, the user may swipe, with a finger, to the right on the volume display control as shown in FIG. 6 to turn up the current audio volume, or swipe to the left to turn down the current audio volume.

According to application requirements, the device may be adjusted in accordance with the stepping of the change in the volume value of the collected sound caused by the swiping operation. For example, in the process of swiping, with the finger, to the left, the zoom value gradually decreases with a span of one-tenth of an adjustable sound range, while in the process of swiping, with the finger, to the right, the zoom value gradually increases with a span of one-tenth of the adjustable sound range. When the user stops operating, a current zoom value is transmitted to a bottom layer, and the volume of the collected sound is turned up or down through an underlying algorithm.

An example of the present disclosure also provides a shooting method. The shooting method is applied to a shooting device (the shooting device may be an electronic device such as a mobile phone and a tablet computer). A volume display control is disposed in a specific region of a preview image to display a volume of collected audio more intuitively. When a user adjusts a zoom value of a camera of the mobile phone, the zoomed zoom value is transmitted to a bottom layer, and the volume of the collected sound is adjusted again through an algorithm.

According to the user's operation of adjusting the zoom value, a volume of the collected sound corresponding to the adjusted zoom value is obtained as a first volume adjustment target, and is denoted as S1.

According to the user's operation on the volume display control, a volume adjustment instruction is obtained. The volume adjustment instruction indicates a second volume adjustment target S2.

Then, an average value of S1 and S2 is taken as a sound volume S3 of the collected sound corresponding to the user's zoom operation.

An example of the present disclosure also provides a shooting method. In the process of recording, a user may use a follow shooting mode, and select, from a camera interface, a target shot subject he wants to follow. When the target shot subject moves, continuous zooming is performed along with the target shot subject, and a volume and adjustable range of a collected sound corresponding to a current focusing distance are shown in the camera interface through a volume display control.

In some examples, the position of the volume display control is variable. For example, the volume display control may move along with the target shot subject. In addition to displaying the volume through the volume display control, swiping may also be performed on the volume display control to input a volume adjustment instruction.

Figure 7:
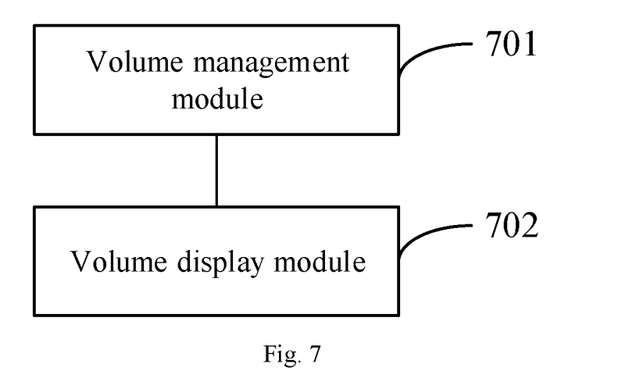
FIG. 7 is a block diagram of a shooting apparatus shown according to some examples of the disclosure.

An example of the present disclosure also provides a shooting apparatus, the structure of which is as shown in FIG. 7. The shooting apparatus includes:

a volume management module 701, configured to adjust a sound volume of a collected sound according to a focusing distance in the image collection process; and a volume display module 702, configured to display volume information corresponding to the sound volume on an image preview interface.

Figure 8:
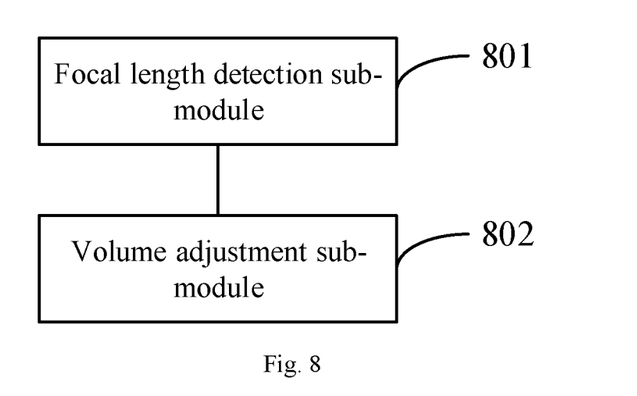
FIG. 8 is a schematic structural diagram of a volume management module shown according to some examples of the disclosure.

In some examples, the collected sound includes a target object sound. The structure of the volume management module 701 is as shown in FIG. 8, and includes:

a focal length detection sub-module 801, configured to detect the focusing distance in the image collection process; and a volume adjustment sub-module 802, configured to adjust a sound volume of the target object sound according to the focusing distance, in which a sound-producing object of the target object sound is located within an image collection range corresponding to the focusing distance.

Figure 9:
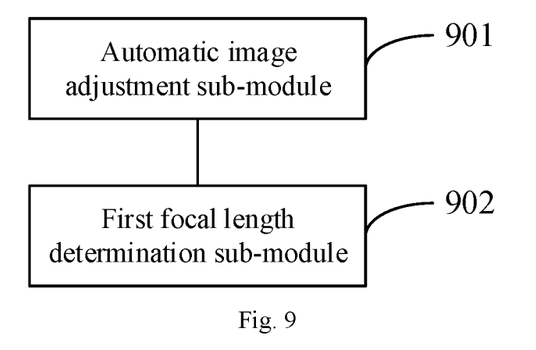
FIG. 9 is a schematic structural diagram of a focal length detection sub-module shown according to some examples of the disclosure.

In some examples, the structure of the focal length detection sub-module 801 is as shown in FIG. 9, and may include:

an automatic image adjustment sub-module 901, configured to follow and shoot the sound-producing object, and adjust a range of a preview image; and a first focal length determination sub-module 902, configured to determine the focusing distance according to the current preview image.

Figure 10:
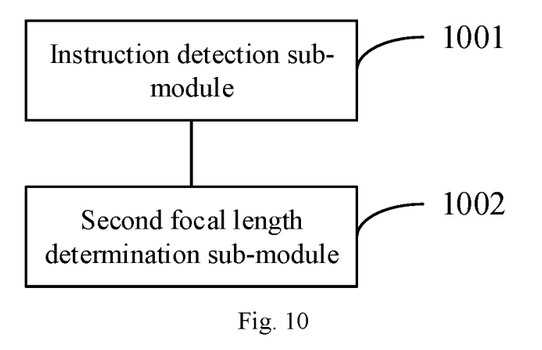
FIG. 10 is a schematic structural diagram of another focal length detection sub-module shown according to some examples of the disclosure.

In some examples, the structure of the focal length detection sub-module 801 is as shown in FIG. 10, and may include:

an instruction detection sub-module 1001, configured to detect a focal length adjustment instruction; and a second focal length determination sub-module 1001, configured to determine the focusing distance according to the focal length adjustment instruction.

Figure 11:
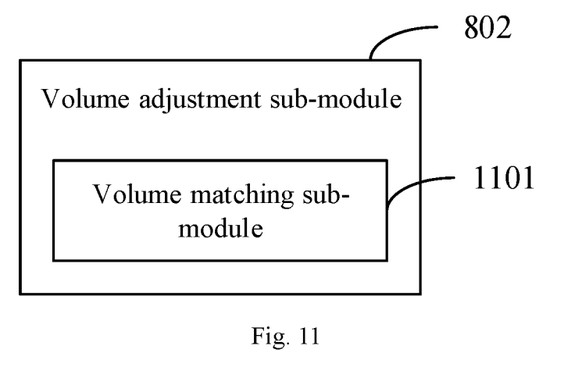
FIG. 11 is a schematic structural diagram of a volume adjustment sub-module shown according to some examples of the disclosure.

In some examples, the structure of the volume adjustment sub-module 802 is as shown in FIG. 11, and may include:

a volume matching sub-module 1101, configured to match the focusing distance with a preset audio collection configuration file to determine the sound volume of the target object sound at the focusing distance.

Figure 12:
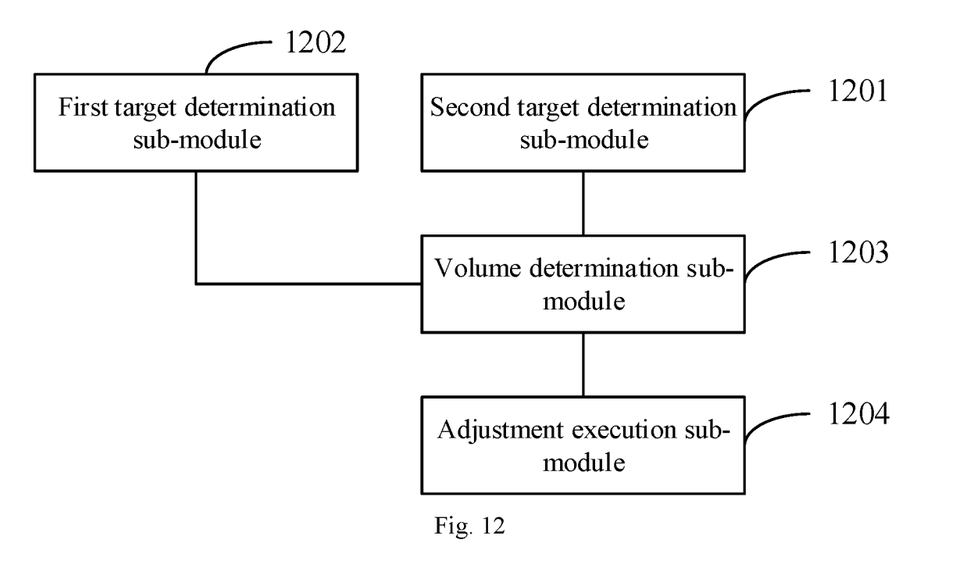
FIG. 12 is a schematic structural diagram of another volume adjustment sub-module shown according to some examples of the disclosure.

In some examples, the structure of the volume adjustment sub-module 802 is as shown in FIG. 12, and may include:

a second target determination sub-module 1201, configured to receive a volume adjustment instruction, in which the volume adjustment instruction indicates a second volume adjustment target;

a first target determination sub-module 1202, configured to match the focusing distance with the preset audio collection configuration file to determine a collected volume corresponding to the focusing distance as a first volume adjustment target;

a volume determination sub-module 1203, configured to determine a target sound volume according to the first volume adjustment target and the second volume adjustment target; and an adjustment execution sub-module 1204, configured to adjust the sound volume to the target sound volume.

Figure 13:
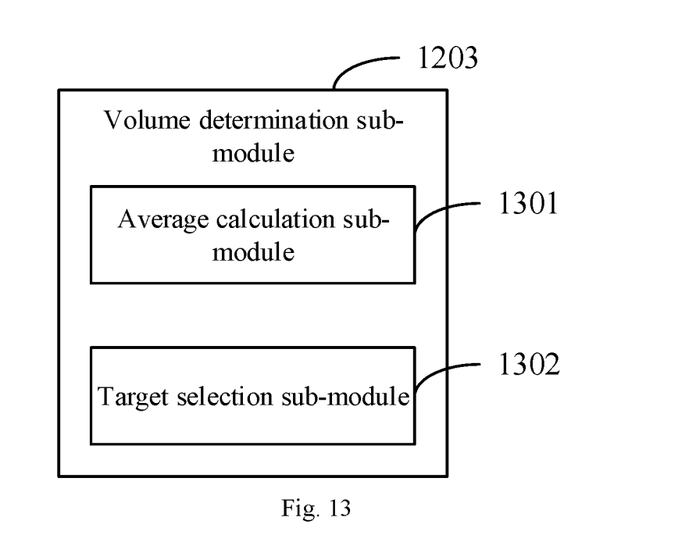
FIG. 13 is a schematic structural diagram of a volume determination sub-module shown according to some examples of the disclosure.

In some examples, the structure of the volume determination sub-module 1203 is as shown in FIG. 13, and may include:

an average calculation sub-module 1301, configured to determine an average value of the first volume adjustment target and the second volume adjustment target as the target sound volume; and a target selection sub-module 1302, configured to determine the target sound volume according to the second volume adjustment target when the first volume adjustment target and the second volume adjustment target are inconsistent.

Figure 14:
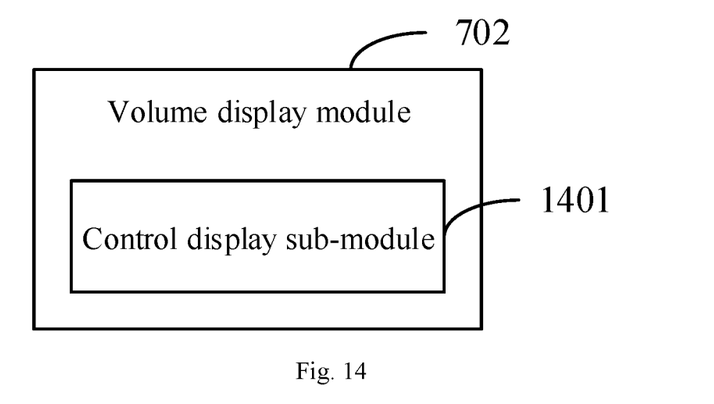
FIG. 14 is a schematic structural diagram of a volume display module shown according to some examples of the disclosure.

In some examples, the structure of the volume display module 702 is as shown in FIG. 14, and may include:

a control display sub-module 1401, configured to display the volume information through the volume display control on the image preview interface.

Figure 15:
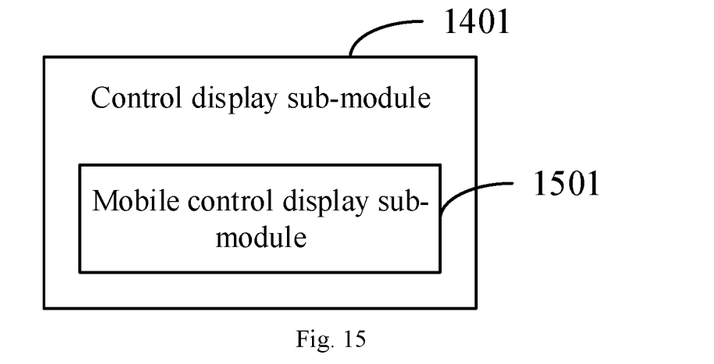
FIG. 15 is a schematic structural diagram of a mobile control display sub-module shown according to some examples of the disclosure.

In some examples, the structure of the control display sub-module 1401 is as shown in FIG. 15, and may include:

a mobile control display sub-module 1501, configured to display the volume display control in a preset area of the sound-producing object in the image preview interface.

The apparatus may be integrated into a shooting device such as a mobile phone and a camera, and corresponding functions are realized by the device. With regard to the apparatus in the example, the specific manner in which each module performs operations has been described in detail in the example of the method, which will not be described in detail here.

An example of the present disclosure also provides a computer apparatus. The computer apparatus may include:

a processor; and a memory configured to store an executable instruction of the processor, in which the processor is configured to:

adjust a sound volume of a collected sound according to a focusing distance in the image collection process; and display volume information corresponding to the sound volume on an image preview interface.

Figure 16:
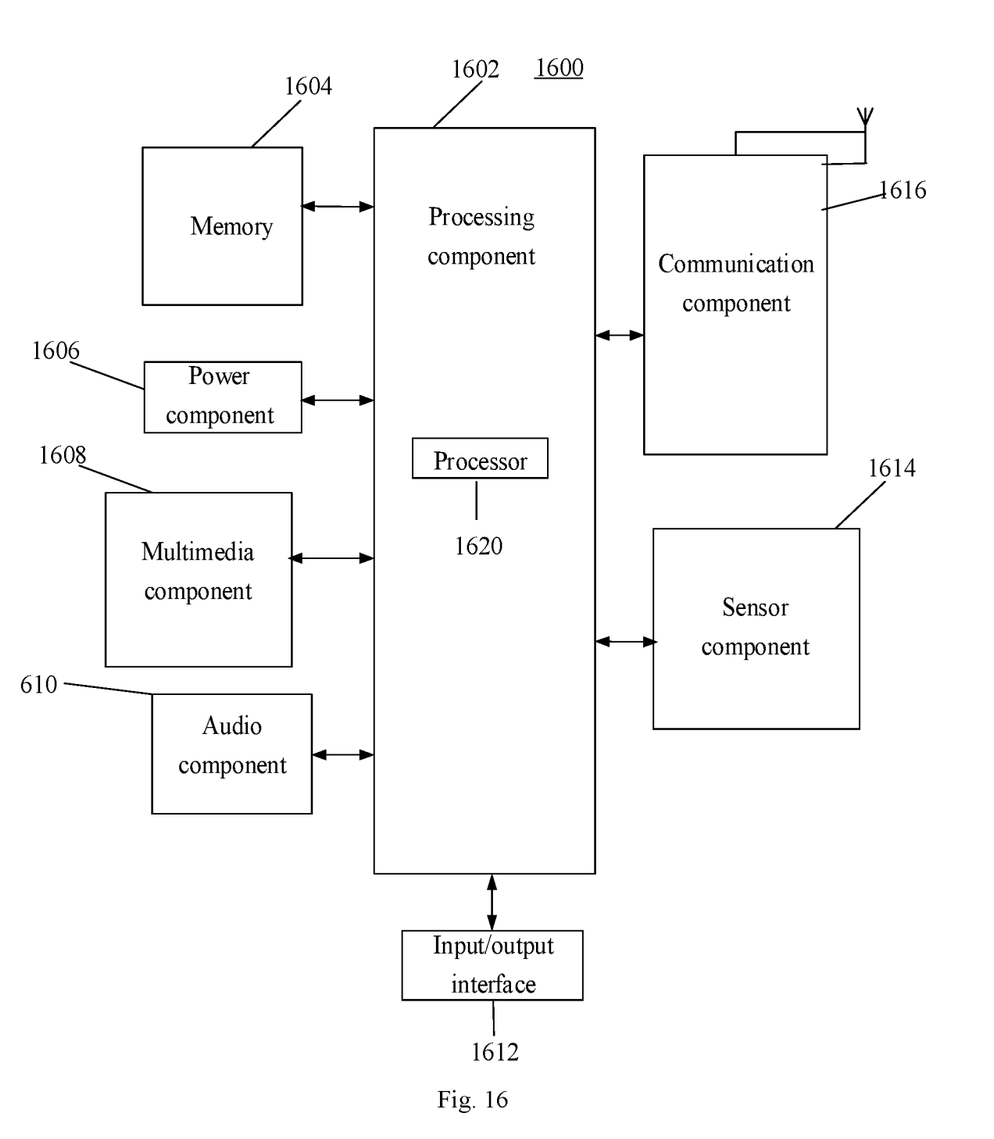
FIG. 16 is a block diagram of an apparatus shown according to some examples of the disclosure.

FIG. 16 is a block diagram of an apparatus 1600 configured to perform shooting according to some examples of the present disclosure. For example, the apparatus 1600 may be a mobile phone, a computer, a digital broadcasting terminal, a messaging device, a game console, a tablet device, a medical device, a fitness device, a personal digital assistant, etc.

Referring to FIG. 16, the apparatus 1600 may include one or more of the following components: a processing component 1602, a memory 1604, a power component 1606, a multimedia component 1608, an audio component 1610, an input/output (I/O) interface 1612, a sensor component 1614, and a communication component 1616.

The processing component 1602 generally controls the overall operations of the apparatus 1600, such as operations associated with display, telephone calls, data communications, camera operations, and recording operations. The processing component 1602 may include one or more processors 1620 to execute instructions to complete all or part of the steps of the method. In addition, the processing component 1602 may include one or more modules to facilitate the interaction between the processing component 1602 and other components. For example, the processing component 1602 may include a multimedia module to facilitate the interaction between the multimedia component 1608 and the processing component 1602.

The memory 1604 is configured to store various types of data to support the operations of the apparatus 1600. Examples of such data include instructions for any application or method operating on the apparatus 1600, contact data, phone book data, messages, pictures, videos, etc. The memory 1604 may be implemented by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 1606 provides power to various components of the apparatus 1600. The power component 1606 may include a power management system, one or more power supplies, and other components associated with generating, managing, and distributing power to the apparatus 1600.

The multimedia component 1608 includes a screen that provides an output interface between the apparatus 1600 and a user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touch, swiping, and gestures on the touch panel. The touch sensor may not only sense the boundary of the touch or swiping action, but also detect the duration and pressure related to the touch or swiping operation. In some examples, the multimedia component 1608 includes a front camera and/or a rear camera. When the apparatus 1600 is in an operation mode, such as a shooting mode or a video mode, the front camera and/or the rear camera may receive external multimedia data. Each of the front camera and the rear camera may be a fixed optical lens system or has a focal length and optical zoom capabilities.

The audio component 1610 is configured to output and/or input audio signals. For example, the audio component 1610 includes a microphone (MIC), and when the apparatus 1600 is in an operation mode, such as a call mode, a recording mode, and a voice recognition mode, the microphone is configured to receive external audio signals. The received audio signals may be further stored in the memory 1604 or transmitted via the communication component 1616. In some examples, the audio component 1610 further includes a speaker configured to output audio signals.

The I/O interface 1612 provides an interface between the processing component 1602 and a peripheral interface module. The peripheral interface module may be a keyboard, a click wheel, buttons, and the like. These buttons may include, but are not limited to: a home button, a volume button, a start button, and a lock button.

The sensor component 1614 includes one or more sensors configured to provide the apparatus 1600 with various aspects of status assessment. For example, the sensor component 1614 may detect the on/off status of the apparatus 1600, and the relative positioning of components, such as a display and a keypad of the apparatus 1600. The sensor component 1614 may also detect the position change of the apparatus 1600 or a component of the apparatus 1600, the presence or absence of contact between the user and the apparatus 1600, the orientation or acceleration/deceleration of the apparatus 1600, and the temperature change of the apparatus 1600.

The sensor component 1614 may include a proximity sensor configured to detect the presence of nearby objects when there is no physical contact. The sensor component 1614 may also include a light sensor, such as a CMOS or CCD image sensor, for use in imaging applications. In some examples, the sensor component 1614 may also include an acceleration sensor, a gyroscope sensor, a magnetic sensor, a pressure sensor, or a temperature sensor.

The communication component 1616 is configured to facilitate wired or wireless communications between the apparatus 1600 and other devices. The apparatus 1600 may access a wireless network based on a communication standard, such as WiFi, 2G, or 3G, or a combination thereof. In some examples, the communication component 1616 receives a broadcast signal or broadcast related information from an external broadcast management system via a broadcast channel. In some examples, the communication component 1616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology and other technologies.

In some examples, the apparatus 1600 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components to execute the above method.

In some examples, a non-transitory computer-readable storage medium including an instruction is further provided, such as the memory 1604 including an instruction, and the above instruction may be executed by the processor 1620 of the apparatus 1600 to complete the above method. For example, the non-transitory computer-readable storage medium may be an ROM, a random access memory (RAM), a CD-ROM, a magnetic tape, a floppy disk, an optical data storage device, etc.

In the non-transitory computer-readable storage medium, when the instruction in the storage medium is executed by the processor of a mobile terminal, the mobile terminal may execute a shooting method. The method may include:

adjusting a sound volume of a collected sound according to a focusing distance in the image collection process; and displaying volume information corresponding to the sound volume on an image preview interface.

In the method and apparatus for adjusting sound volume in shooting process provided by the examples of the present disclosure, the sound volume of the collected sound is adjusted according to the focusing distance in the image collection process, and the volume information corresponding to the sound volume is displayed on the image preview interface. A flexible sound collection solution adapted to an image in the image collection process is realized, and the problem that a sound is uncontrollable in the image collection process and affects user experience is solved.

When a collected video and other image files are played, the sound volume increases as the focusing distance zooms in, and decreases as the focusing distance zooms out, which makes the video more realistic and greatly improves the use experience of the user.

The sound volume of the collected sound may be adjusted automatically according to the focusing distance, or may be adjusted both manually and automatically, to better meet the shooting needs. A visual display and operation region makes sound features in the image collection process more intuitive, which is convenient for users to understand the shooting information and improve the quality of shots.

The present disclosure may include dedicated hardware implementations such as disclosure specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other examples of the present disclosure will be apparent to those skilled in the art from consideration of the specification and practice of the disclosure disclosed herein. The present application is intended to cover any variations, uses, or adaptations of the present disclosure, and the variations, uses, or adaptations follow the general principles of the present disclosure and include common general knowledge or customary technical means in the art not disclosed in the present disclosure. It is intended that the specification and examples be considered as exemplary only.

It is to be understood that the present disclosure is not limited to the precise constructions described above and shown in the drawings, and that various modifications and changes may be made without departing from the scope thereof.

What is claimed is:

1. A shooting method, comprising:
   detecting a focusing distance in an image collection process;
   receiving a volume adjustment instruction, wherein the volume adjustment instruction indicates a second volume adjustment target;
   matching the focusing distance with a preset audio collection configuration file to determine a collected volume corresponding to the focusing distance as a first volume adjustment target;
   determining a target sound volume according to the first volume adjustment target and the second volume adjustment target;
   adjusting a sound volume of a target object sound to the target sound volume in the image collection process, wherein a sound-producing object of the target object sound is located within an image collection range corresponding to the focusing distance; and
   displaying volume information corresponding to the sound volume on an image preview interface.

2. The shooting method according to claim 1, wherein detecting the focusing distance in the image collection process comprises:
   following and shooting the sound-producing object, and adjusting a range of a preview image; and
   determining the focusing distance according to a current preview image.

3. The shooting method according to claim 1, wherein detecting the focusing distance in the image collection process comprises:
   detecting a focal length adjustment instruction; and
   determining the focusing distance according to the focal length adjustment instruction.

4. The shooting method according to claim 1, wherein determining the target sound volume according to the first volume adjustment target and the second volume adjustment target comprises:
   determining an average value of the first volume adjustment target and the second volume adjustment target as the target sound volume.

5. The shooting method according to claim 1, wherein determining the target sound volume according to the first volume adjustment target and the second volume adjustment target comprises:
   determining the target sound volume according to the second volume adjustment target in a case where the first volume adjustment target and the second volume adjustment target are inconsistent.

6. The shooting method according to claim 1, wherein displaying the volume information corresponding to the sound volume on the image preview interface comprises:
   displaying the volume information on the image preview interface through a volume display control.

7. The shooting method according to claim 6, wherein displaying the volume information corresponding to the sound volume on the image preview interface comprises:
   displaying the volume display control in a preset region of a sound-producing object in the image preview interface.

8. A computer apparatus, comprising:
   a processor; and
   a memory, configured to store an executable instruction of the processor; wherein
   the processor is configured to:
   detect a focusing distance in an image collection process;
   receive a volume adjustment instruction, wherein the volume adjustment instruction indicates a second volume adjustment target;
   match the focusing distance with a preset audio collection configuration file to determine a collected volume corresponding to the focusing distance as a first volume adjustment target;
   determine a target sound volume according to the first volume adjustment target and the second volume adjustment target;
   adjust a sound volume of a target object sound to the target sound volume in the image collection process, wherein a sound-producing object of the target object sound is located within an image collection range corresponding to the focusing distance; and
   display volume information corresponding to the sound volume on an image preview interface.

9. The computer apparatus according to claim 8, wherein the processor configured to detect the focusing distance in the image collection process is further configured to:
   follow and shoot the sound-producing object, and adjusting a range of a preview image; and
   determine the focusing distance according to a current preview image.

10. The computer apparatus according to claim 8, wherein the processor configured to detect the focusing distance in the image collection process is further configured to:
    detect a focal length adjustment instruction; and
    determine the focusing distance according to the focal length adjustment instruction.

11. The computer apparatus according to claim 8, wherein the processor configured to determine the target sound volume according to the first volume adjustment target and the second volume adjustment target is further configured to:
    determine an average value of the first volume adjustment target and the second volume adjustment target as the target sound volume; and/or
    determine the target sound volume according to the second volume adjustment target in a case where the first volume adjustment target and the second volume adjustment target are inconsistent.

12. The computer apparatus according to claim 8, wherein the processor configured to display the volume information corresponding to the sound volume on the image preview interface is further configured to:

display the volume information on the image preview interface through a volume display control.

13. The computer apparatus according to claim 12, wherein the processor is further configured to display the volume display control in a preset region of a sound-producing object in the image preview interface.

14. A non-transitory computer-readable storage medium, wherein, when an instruction stored in the storage medium is executed by a processor of a mobile terminal, the mobile terminal performs:

detecting a focusing distance in an image collection process;

receiving a volume adjustment instruction, wherein the volume adjustment instruction indicates a second volume adjustment target;

matching the focusing distance with a preset audio collection configuration file to determine a collected volume corresponding to the focusing distance as a first volume adjustment target;

determining a target sound volume according to the first volume adjustment target and the second volume adjustment target;

adjusting a sound volume of a target object sound to the target sound volume in the image collection process, wherein a sound-producing object of the target object sound is located within an image collection range corresponding to the focusing distance; and displaying volume information corresponding to the sound volume on an image preview interface.

* * * * *